United States Patent
Johnson

(10) Patent No.: US 9,858,953 B1
(45) Date of Patent: Jan. 2, 2018

(54) METHOD OF REMOVING HEAD CONTAMINATION DURING CONTACT DETECTION

(71) Applicant: Seagate Technology LLC, Cupertino, CA (US)

(72) Inventor: Michael Thomas Johnson, Minneapolis, MN (US)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 15/475,364

(22) Filed: Mar. 31, 2017

(51) Int. Cl.
*G11B 5/09* (2006.01)
*G11B 5/41* (2006.01)
*G11B 5/60* (2006.01)
*G11B 5/00* (2006.01)

(52) U.S. Cl.
CPC .......... *G11B 5/41* (2013.01); *G11B 5/607* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 5,615,196 A * | 3/1997 | Kato | G11B 7/08582 369/71 |
| 5,701,224 A * | 12/1997 | Sakui | G11B 5/41 360/128 |
| 6,307,832 B1 | 10/2001 | Novotny et al. | |
| 6,992,865 B2 | 1/2006 | Thurn et al. | |
| 7,573,682 B2 | 8/2009 | Pust et al. | |
| 7,609,488 B2 | 10/2009 | Bonin et al. | |
| 8,004,786 B2 | 8/2011 | Feist et al. | |
| 8,009,380 B2 | 8/2011 | Matsushita et al. | |
| 8,139,310 B1 * | 3/2012 | Hogg | G11B 5/607 360/25 |
| 8,665,546 B1 * | 3/2014 | Zhao | G11B 5/607 360/55 |
| 8,711,508 B2 | 4/2014 | Kurita et al. | |
| 8,730,610 B2 | 5/2014 | McFadyen et al. | |
| 8,995,076 B1 | 3/2015 | Olson et al. | |
| 8,995,078 B1 * | 3/2015 | Setuwanto | G11B 5/41 360/55 |
| 2004/0027927 A1 * | 2/2004 | Murakami | G11B 5/41 369/13.02 |
| 2005/0024775 A1 * | 2/2005 | Kurita | G11B 5/6064 360/234.3 |
| 2012/0020197 A1 * | 1/2012 | Matsuda | G11B 7/1359 369/100 |
| 2015/0085632 A1 | 3/2015 | Kiely et al. | |

FOREIGN PATENT DOCUMENTS

WO 2006022976 A2 3/2006

* cited by examiner

Primary Examiner — Peter Vincent Agustin
(74) Attorney, Agent, or Firm — Kagan Binder, PLLC

(57) ABSTRACT

A method of removing contamination from a magnetic recording head during contact detection, including the steps of setting a heat actuator at a first power level, dwelling at the first power level for a specified length of time, removing contamination from the head during the specified dwell time, oscillating the heat actuator from the first power level to a second level that is lower than the first level while detecting periodic contact between the head and an adjacent disk, calculating the amplitude of the detected periodic contact, and correlating the calculated amplitude to a clearance distance between the head and the disk.

10 Claims, 5 Drawing Sheets

METHOD OF REMOVING HEAD CONTAMINATION DURING CONTACT DETECTION

BACKGROUND

Hard disk drive (HDD) systems typically include one or more data storage disks with concentric tracks containing information. A transducing head carried by a slider is used to read from and write to a data track on a disk, wherein each slider has an air bearing surface that is supportable by a cushion of air generated by one of the rotating disks. The slider is carried by an arm assembly that includes an actuator arm and a suspension assembly, which can include a separate gimbal structure or can integrally form a gimbal.

In more particularity, many disk drives include a transducer that "flies" only a few nanometers above a rotating disk surface. The transducer is mounted in a slider assembly which has a contoured surface. When the disk is at rest, the air bearing slider is in contact with the disk. During operation, the disk rotates at high speed, and an air bearing force is produced by pressurization of the air as it flows between the disk and slider. This air force acts upon a lower air bearing surface of the slider and generates a lift force directing the slider away from the disk and against a load beam causing the slider to fly at an ultra-low height above the disk. Thus, the air force prevents unintentional contact between the transducer and the disk and also provides a very narrow clearance between the slider transducer and the rotating disk. This allows a high density of magnetic data to be transferred and reduces wear and damage. The height at which the read/write head of a slider is positioned above a rotating disk when no reading or writing is taking place is known as the passive fly height, which height is decreased to an operational clearance when reading and/or writing is taking place Because the demand for disk storage systems with large storage capacities is increasing, the density of concentric data tracks on disks is increasing, which in turn requires that the air bearing gap between the transducing head and the rotating disk be reduced to even lower flying heights. During operation of the magnetic data storage and retrieval system, the transducing head is positioned in close proximity to the magnetic media. A distance between the transducer and the media is preferably small enough to allow for writing to and reading from a magnetic medium, and great enough to prevent contact between the magnetic media and the transducer. As the average flying height of the slider decreases, the transducer achieves greater resolution between the individual data bit locations on the disk. Therefore, operational flying height or clearance is one of the most critical parameters of magnetic recording for drive performance and reliability.

Detection of head-media contact is one known method of establishing head-media spacing in a storage system. This can be accomplished by determining a zero reference using an actuator to make the head contact the disk. However, contamination on the head can cause an early contact detect trigger, which leads to an incorrect zero reference being used as the clearance setting. Such contamination can particularly be an issue with heat-assisted magnetic recording (HAMR) processes due to elevated head and media temperatures. Thus, a need exists for consistently removing head contamination at each heat actuator power step in systems that use heat-assisted magnetic recording (HAMR) processes.

SUMMARY

Aspects of the invention described herein are directed to a method of removing contamination from a magnetic recording head during contact detection, the method including the steps of setting a heat actuator at a first power level, dwelling at the first power level for a specified length of time, removing contamination from the head during the specified dwell time, oscillating the heat actuator from the first power level to a second level that is lower than the first level while detecting periodic contact between the head and an adjacent disk, calculating the amplitude of the detected periodic contact, and correlating the calculated amplitude to a clearance distance between the head and the disk.

The method may further include a step of determining whether a signal generated in the step of calculating the amplitude of the detected periodic contact shows contact. The step of oscillating the heat actuator may include oscillating a low-frequency A/C heater. The step of detecting periodic contact between the head and the adjacent disk may include detecting the periodic contact with a thermal sensing wire, wherein the thermal sensing wire may include a dual-ended temperature coefficient of resistance sensor. The step of calculating the amplitude of the detected periodic contact may include performing calculations using at least one of discrete Fourier transform techniques and phase lock techniques.

These and various other features and advantages will be apparent from a reading of the following detailed description.

BRIEF DESCRIPTION OF THE DRAWINGS

The present invention will be further explained with reference to the appended Figures, wherein like structure is referred to by like numerals throughout the several views, and wherein.

DETAILED DESCRIPTION

The methods and features described herein are applicable to typical hard disk drive systems, which include at least one magnetic storage disk configured to rotate about an axis, an actuation motor (e.g., a voice coil motor), an actuator arm, a suspension assembly that includes a load beam, and a slider carrying a transducing or read/write head. The slider is supported by the suspension assembly, which in turn is supported by actuator arm. Together, the actuator arm, the suspension assembly and slider form a head stack assembly (HSA). The actuation motor is configured to pivot the actuator arm about an axis in order to sweep suspension and slider in an arc across a surface of the rotating disk with the slider "sliding" or "flying" across the disk on a cushion of air, often referred to as an air bearing. The read/write head carried by the slider can be positioned relative to selected concentric data tracks of the disk by a piezoelectric microactuator, for example. A stack of co-rotating disks can be provided with additional actuator arms, suspension assemblies, and sliders that carry read/write heads for reading and writing at top and bottom surfaces of each disk in the stack.

The read/write heads described above are carried by a slider that is used to read from and write to a data track on a disk. The slider is carried by an arm assembly that includes an actuator arm and a suspension assembly, which can include a separate gimbal structure or can integrally form a gimbal. In a typical process, an array of sliders are formed on a common substrate or an AlTiC wafer which is then sliced to produce bars, with a row of sliders in a side-by-side pattern on each bar. The bars (which can be referred to as row bars) are then subjected to a series of processes to form individual sliders, including lapping, cleaning, formation of air-bearing surfaces (ABS), and dicing.

Figure 1:
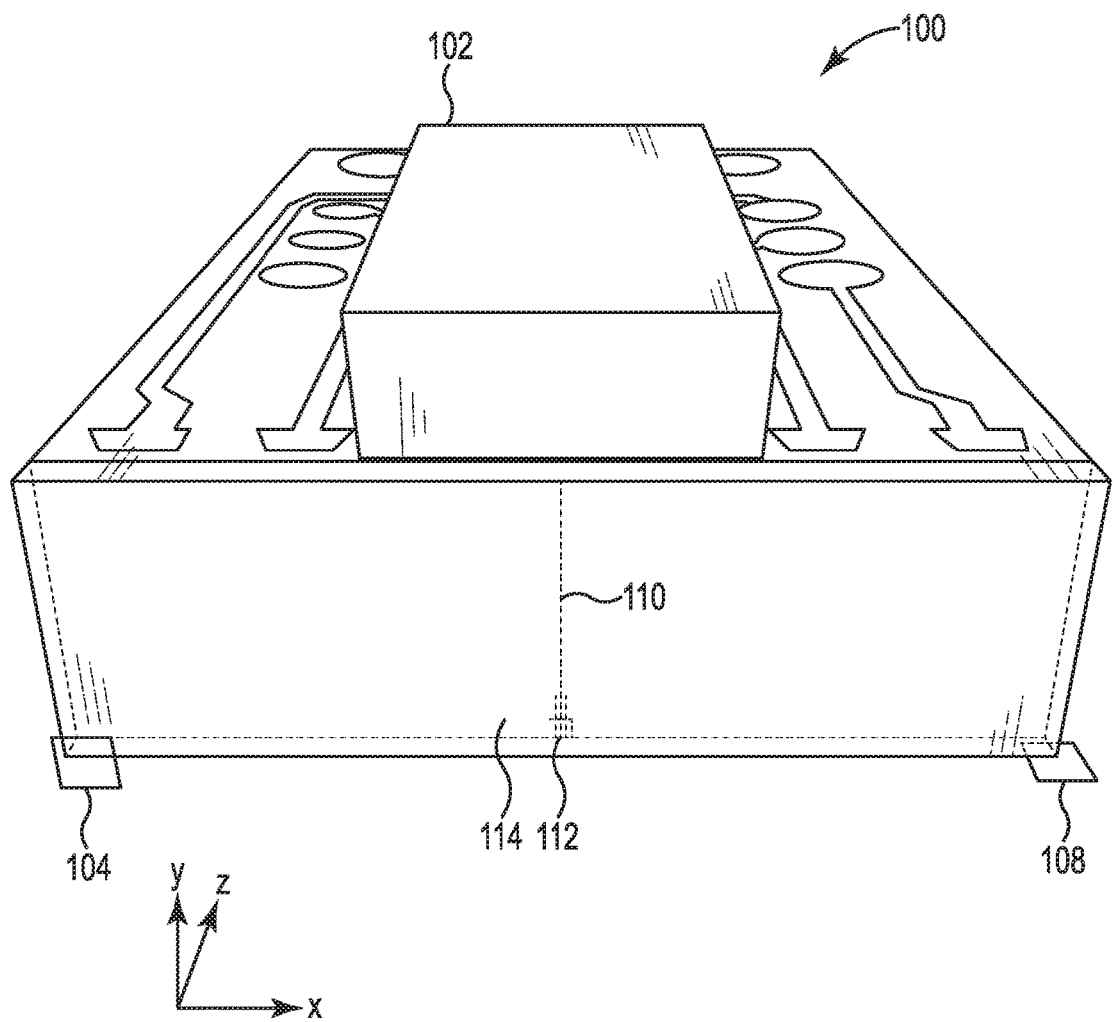
FIG. 1 is a perspective view of a slider assembly according to an exemplary embodiment.

Referring now to the Figures, wherein the components are labeled with like numerals throughout the several Figures, and initially to FIG. 1, a magnetic recording head arrangement is configured for heat assisted magnetic recording (HAMR) including a slider assembly 100. It should be noted that the described concepts relating to contamination detection and removal need not be limited to HAMR devices, but similar concepts can be applied to conventional magnetic recording heads and/or to any other device having an analogous head media interface (HMI).

As illustrated, the slider assembly 100 includes an energy source 102 (e.g., a laser diode) configured to produce laser light that energizes an optical antenna, also referred to as a near field transducer (NFT) 112. The laser light produced by the energy source 102 is guided through an optical waveguide 110 and is focused on the NFT 112 by a focusing device such as a tapered optical waveguide or a parabolic mirror. Heat generated by operation of the recording head is measured by one or more thermal sensors 114. The sensors may be located near a media-facing surface 108. The energy source 102 is shown here as integral to the slider assembly, although in other arrangements a laser or other energy source may be externally located.

The slider assembly 100 tracks across the magnetic recording medium in a direction generally indicated by the x-axis of FIG. 1, also referred to as the cross-track direction. Relative to the slider assembly 100, the magnetic recording medium rotates in the z-axis direction, referred to as the down-track direction. The edge of the slider that first passes over any position of the rotating recording medium in the down-track direction is referred to as the leading edge, and the edge of the slider that is last to pass over the position of the recording medium is referred to as the trailing edge, designated by plane 104. The slider assembly 100 reads and/or writes bits to the rotating magnetic recording medium as the magnetic recording medium rotates relative to the slider.

Although thermal sensor 114 can be a variety of types of thermal sensors, an exemplary thermal sensor 114 is a resistance temperature sensor composed of materials having a known temperature coefficient of resistance (TCR). Other types of thermal sensors can be employed, such as a varistor or a thermocouple, for example. One example of a TCR sensor is a dual-ended temperature coefficient of resistance sensor (DETCR). A TCR sensor measures temperature change by measuring the change in resistance or rate of change in resistance, across the sensor. The thermal sensor 114 measures the temperature change at media-facing surface 108 induced by thermal condition changes from air pressure, clearance, head operation, and contact, among other changes.

Figure 2:
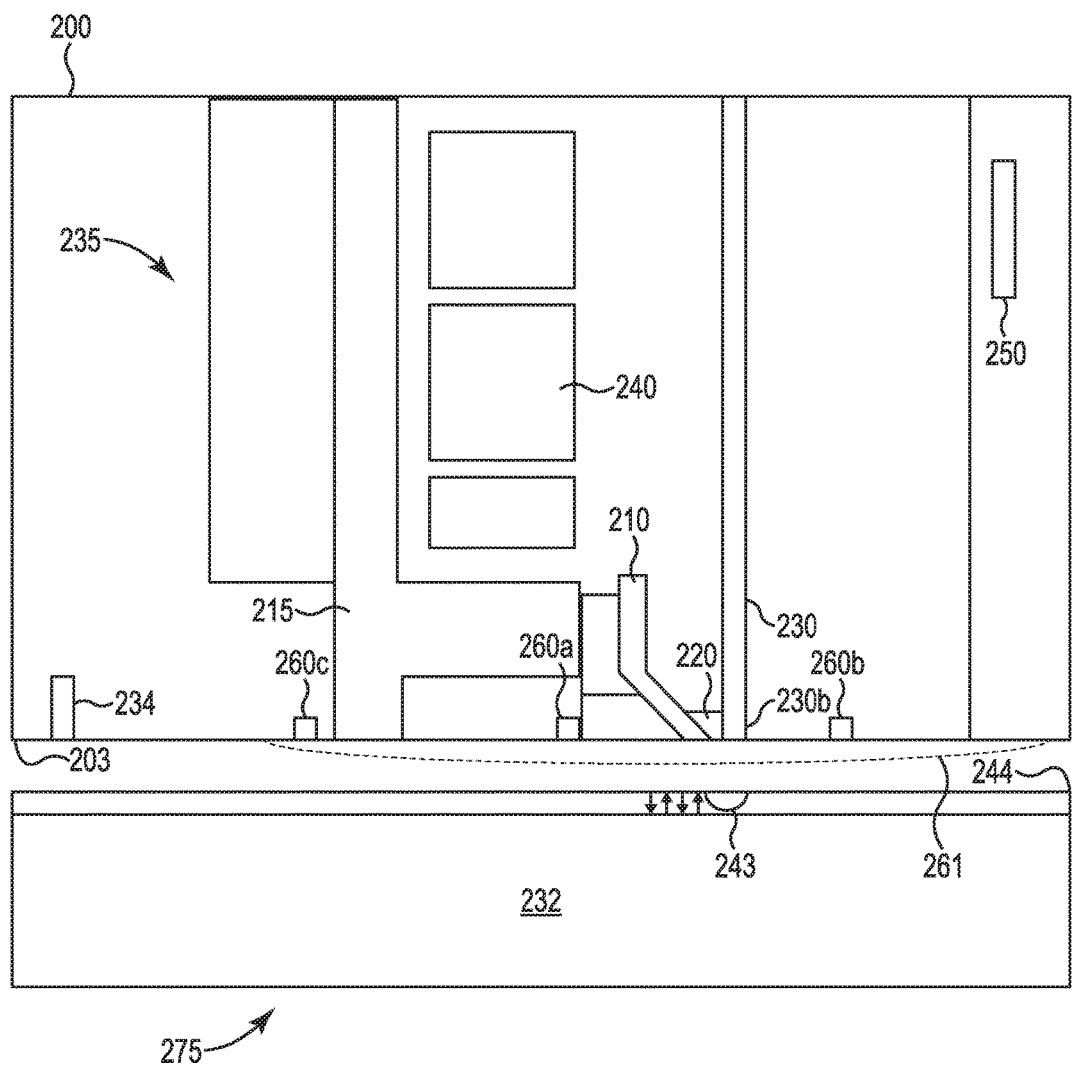
FIG. 2 is a cross-sectional view of an exemplary magnetic recording head arrangement.

FIG. 2 is a schematic cross-sectional diagram showing a head transducer 200 according to various embodiments. An NFT 220 is located between a write pole 210 and a waveguide 230 at a media-facing surface 203. The head transducer 200 is shown positioned over a writeable medium 275 (e.g., a magnetic disk) that generally includes a plate or substrate 232 on which a hard magnetic layer 244 is deposited or otherwise formed. A small portion or spot of the layer 244 (represented by reference numeral 243, which can be proportionally larger or smaller than illustrated) is heated via waveguide 230 and NFT 220 to reduce the coercivity of the material until the magnetic field from the magnetic write pole 210 is strong enough to change the magnetization direction of the recording layer 244. Bits of information may then be recorded in the form of a perpendicular upward downward magnetization direction for a series of magnetic domains in the layer 244.

The portion of head transducer 200 illustrated in FIG. 2 may include a number of heat generating components at the media-facing surface 203, such as write coil 240, NFT 220, and a heater 250. Due to thermal expansion of the surrounding material, the heat can cause thermal expansion or protrusion at the media-facing surface 203, as is represented by dashed line 261. Generally, the heater 250 is used to finely adjust head-media spacing near the expanded configuration of surface 203 to obtain a desired spacing between the media 275 and read/write transducers 234, 235.

One or more thermal sensors, e.g., TCR sensors, can be located within a protrusion region at one or more optional locations. Historically these sensors have been used during manufacturing to set head-disk spacing. Thermal sensors may also be used for thermal asperity (TA) detection. As shown in FIG. 2, optional thermal sensors 260a, 260b, 260c are located at different locations along the region of protrusion 261. It is contemplated that more or less thermal sensors are used and that can be located at different positions along the media-facing surface 203.

In one configuration, at least a portion of thermal sensor 260a is co-extensive with a portion of the return pole 215 along an axis normal to the media-facing surface 203. Thermal sensor 260a is situated in an uptrack/downtrack direction from at least one of the NFT 220 and write pole 210. In other configurations, a thermal sensor is located outside the region of the writer 235. For example, thermal sensor 260b can be located between a waveguide 230, which is optically coupled to NFT 220, and heater 250 (e.g., positioned nearer to waveguide 230 than heater 250). Thermal sensor 260c illustrates a third optional location within the protrusion region of the air bearing surface and adjacent the return write pole 215.

The thermal sensors (e.g., sensors 260a, 260b, and 260c) are coupled to signal processing circuitry as is known in the art. The circuitry determines temperatures at or near the media-facing surface 203, and those measured temperatures can be used for a number of purposes, such as controlling the heater 250 to adjust head-media spacing at the protrusion region 261, in accordance with methods of the present invention. It has been demonstrated that for a head transducer having a thermal sensor reasonably close to the NFT 220, it is possible to measure changes in thermal conductance across the head-disc interface and to use this to monitor changes, such as those due to clearance changes or due to contamination.

Contamination on the media-facing surface 203 can have an effect on the temperature readings due to changes in heat transfer from the surface 203. For example, if the contaminant is a thermal insulator, higher than normal temperatures may result at the media-facing surface 203 due to a decrease in heat transfer to the medium 275. This may result in the protrusion 261 being greater than normal for a given heater power. The reverse effect may be seen if the contaminant is a thermal conductor, or otherwise decreases thermal resistance (e.g., increases surface area for convective heat transfer).

In accordance with the invention, contamination of the media-facing surface 203 of the magnetic head can be detected for heat assisted magnetic recording (HAMR) that is caused by elevated head and media temperatures. With methods of the invention, the interface between a head and a disk is monitored for changes caused by contamination, after which a dwell is introduced into the system to mitigate the contamination, as is described below.

Figure 3:
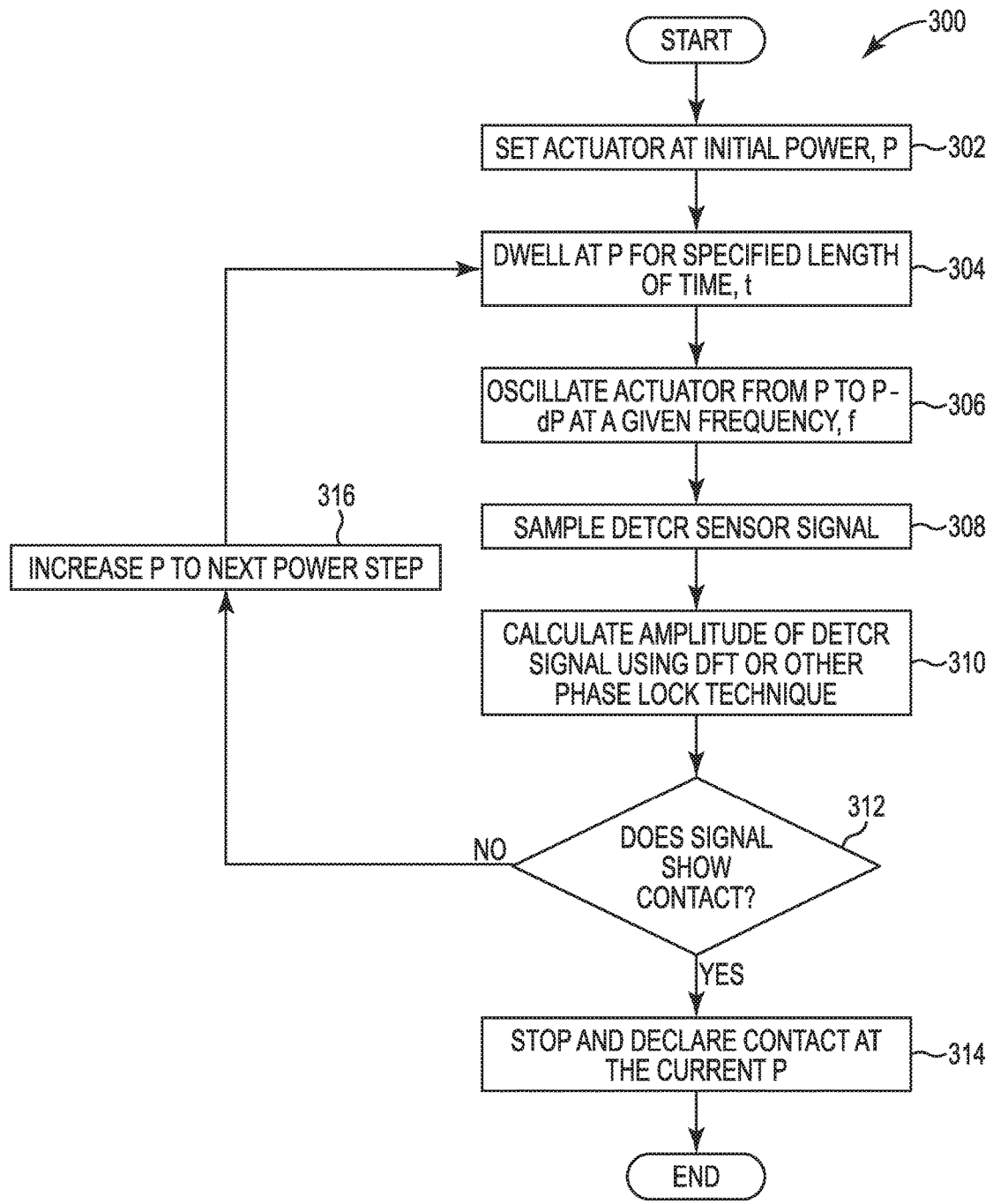
FIG. 3 is a flowchart illustrating an exemplary method of the invention.

Referring particularly to FIG. 3, a flow chart 300 is provided to illustrate an exemplary method of removing the head contamination at each heat actuator (heater) power step during a sweep to contact, in accordance with the invention. As shown, the method involves the step 302 of setting an actuator at an initial power, after which the system is dwelled at that initial power for a specified length of time, as illustrated by step 304. Contamination that is detected on the disk is removed at this time. In step 306, the actuator is oscillated between the initial power and a lower power level at a given frequency. A thermal sensing wire or dual-ended temperature coefficient of resistance sensor (DETCR) is then used at step 308 to detect periodic contact with the disk caused by the oscillation. The amplitude of the DETCR signal is then calculated using discrete Fourier transform (DFT) or other phase lock techniques, represented by step 310. At decision step 312, a determination is made on whether the signal calculated in step 308 shows contact with the disk. If no contact is detected, the initial power is increased to a higher power level, as indicated by step 316, and the process returns to step 304, wherein the dwell is again provided at this higher power level. The steps are then repeated until the point where the signal does show contact in step 312. At that point, the process is terminated and contact is declared at the last applied power level, as is illustrated by step 314.

In more particularity, the methods of the invention involve removal of head contamination at each heat actuator (heater) power step during a sweep to contact. This is done by including the dwell described above that provides time to scrape off the contamination at the heater power step. Such a dwell needs only to be long enough to allow the contamination to be removed, although the dwell can continue after contamination removal, such as if timing constraints are required by other processes in the method. This contamination removal (and dwell) occurs prior to contact detection measurement being performed. Specifically, contact detection using oscillation on the low-frequency A/C heater (LFACH) can be modified to include such a dwell. During operation of the LFACH, a thermal sensing wire (DETCR) can be used to detect periodic contact with the disk caused by the oscillation. Once the head contamination is removed, an early trigger event is avoided and the DETCR responds to contact with the disk as expected.

Figure 4A:
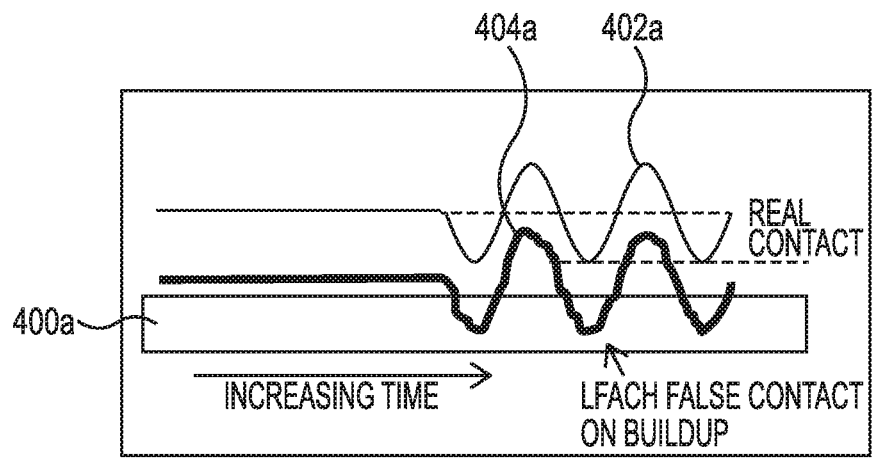
FIG. 4a is a graph illustrating clearance between a head and a disk as a function of time for a single low frequency A/C heater power step, wherein the head includes surface contamination.
Figure 4B:
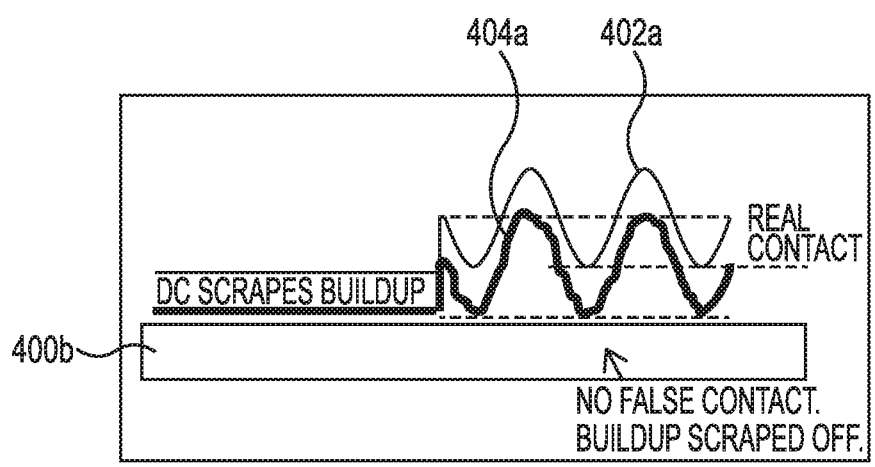
FIG. 4b is a graph illustrating clearance between a head and a disk as a function of time for a single low frequency A/C heater power step in accordance with the invention, wherein a dwell is introduced during which contamination is scraped off of the head.

Referring now to the graphs provided in FIGS. 4a and 4b, clearance as a function of time for a single LFACH heater power step is illustrated, with FIG. 4a illustrating the head and buildup clearance for a typical LFACH heater step and FIG. 4b illustrating a LFACH heater step that utilizes a DC dwell to clean the head before proceeding, in accordance with the invention.

With regard to previously known methods, FIG. 4a illustrates the real clearance of a head relative to a disk 400a with a top, thin line 402a, and further illustrates contamination on the head relative to disk 400a with the bottom, thicker line 404a. For this standard LFACH measurement, the heater power is oscillated above and below the target power. This results in the buildup being in periodic contact with the disk 400a and an early contact trigger is generated.

In accordance with the present invention, FIG. 4b illustrates the real clearance of a head relative to a disk 400b with a top, thin line 402b, and further illustrates contamination on the head relative to disk 400b with the bottom, thicker line 404b. In this embodiment, a DC dwell is performed during which the contamination is scraped off of the head before the heater oscillation, as is discussed above. During the oscillation, the buildup does not contact the disk 400b and no early contact trigger is seen. Note that for this case, a higher clearance or spacing between the head and the disk is correlated with a lower heater power during the oscillation.

Figure 5A:
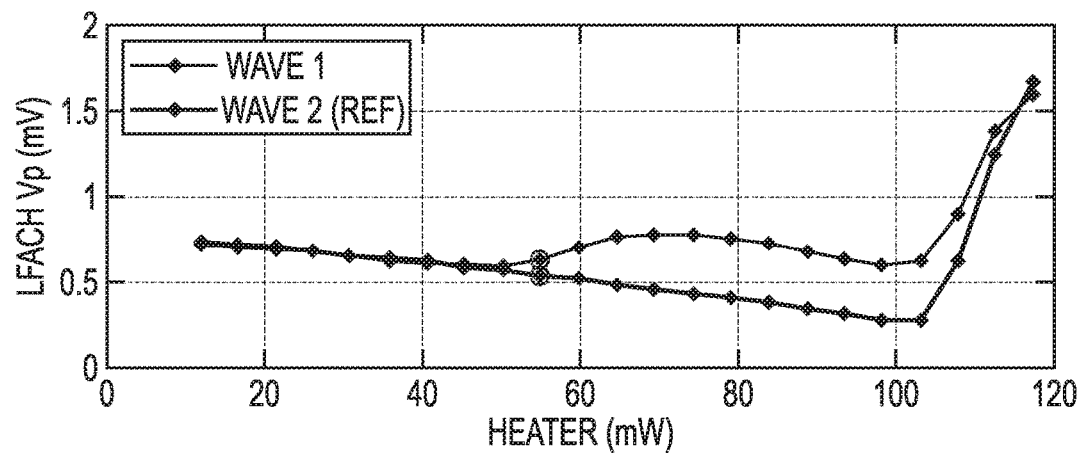
FIG. 5a is a graph of data that illustrates contact detect curves for heads with and without contamination in accordance with previously known methods, wherein an early contact trigger occurs on the sample that includes head contamination.

FIG. 5a is a graph that illustrates contact detect curves for the measurements of two heads with a standard LFACH contact detect, such as is previously known in the art, using a mechanical tester and tested on HAMR heads. The heads had laser induced buildup or contamination that was generated on the DETCR by heating for 30 minutes with the laser on. FIG. 5a shows contact detect curves for heads measured with the standard LFACH algorithms. This graph shows a curve 500a with buildup and a curve 502a without buildup on the head. Results of this standard LFACH contact detection shows an early contact trigger at 55 mW. This is compared to real contact with the disk at 105 mW.

Figure 5B:
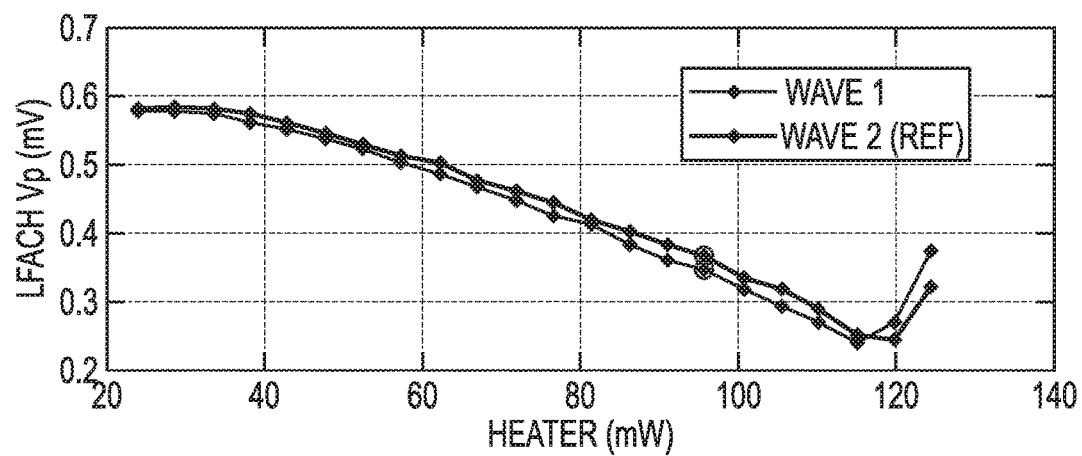
FIG. 5b is a graph of data that illustrates contact detect curves for heads with and without contamination in accordance with methods of the invention that include a cleanup dwell, wherein no early contact trigger occurs on the sample that includes contamination.

In contrast, FIG. 5b is a graph that illustrates contact detect curves for a situation in accordance with the invention in which the cleanup dwell has been implemented, and particularly illustrates the measurements for two heads using a mechanical tester and tested on HAMR heads. The heads had laser-induced buildup or contamination that was generated on the DETCR by heating for 30 minutes with the laser on. As shown, no early contact trigger exists when buildup is present. That is, no early contact trigger occurs on the sample that includes contamination. Note that because the cleanup dwell is implemented in the heater control software, no design change to the head or pre-amp is required.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. The implementations described above and other implementations are within the scope of the following claims.

What is claimed is:

1. A method of removing contamination from a magnetic recording head during contact detection, comprising the steps of:

setting a heat actuator at a first power level;

dwelling at the first power level for a specified length of time;

removing contamination from the head during the specified dwell time;

oscillating the heat actuator from the first power level to a second power level that is lower than the first power level while detecting periodic contact between the head and an adjacent disk;

calculating the amplitude of the detected periodic contact; and correlating the calculated amplitude to a clearance distance between the head and the disk.

2. The method of claim 1, further comprising a step of determining whether a signal generated in the step of calculating the amplitude of the detected periodic contact shows contact between the head and the disk.

3. The method of claim 2, wherein when the generated signal does not show contact between the head and the disk, the method further includes:

increasing the first power level to a third power level for a specified period of time;

dwelling at the third power level for a specified length of time;

removing contamination from the head during the specified dwell time;

oscillating the heat actuator from the third power level to a fourth power level that is lower than the third power level while detecting periodic contact between the head and an adjacent disk;

calculating the amplitude of the detected periodic contact;

correlating the calculated amplitude to a clearance distance between the head and the disk; and repeating the steps at increased power levels until the generated signal shows contact between the head and the disk.

4. The method of claim 3, further comprising stopping the repeating of steps when the generated signal shows contact between the head and the disk.

5. The method of claim 1, wherein the step of oscillating the heat actuator comprises oscillating a low-frequency A/C heater.

6. The method of claim 1, wherein the step of detecting periodic contact between the head and the adjacent disk comprises detecting the periodic contact with a thermal sensing wire.

7. The method of claim 6, wherein the thermal sensing wire comprises a dual-ended temperature coefficient of resistance sensor.

8. The method of claim 1, wherein the step of calculating the amplitude of the detected periodic contact comprises performing calculations using at least one of discrete Fourier transform techniques and phase lock techniques.

9. The method of claim 1, wherein the step of removing contamination from the head causes the clearance distance between the head and the disk to be higher than without said contamination removal step.

10. The method of claim 9, wherein the higher clearance distance produced between the head and the disk is correlated with a lower first power level of the heat actuator.

* * * * *